July 18, 1961   J. L. MAHER   2,992,814
GAS SCRUBBERS
Filed April 21, 1958
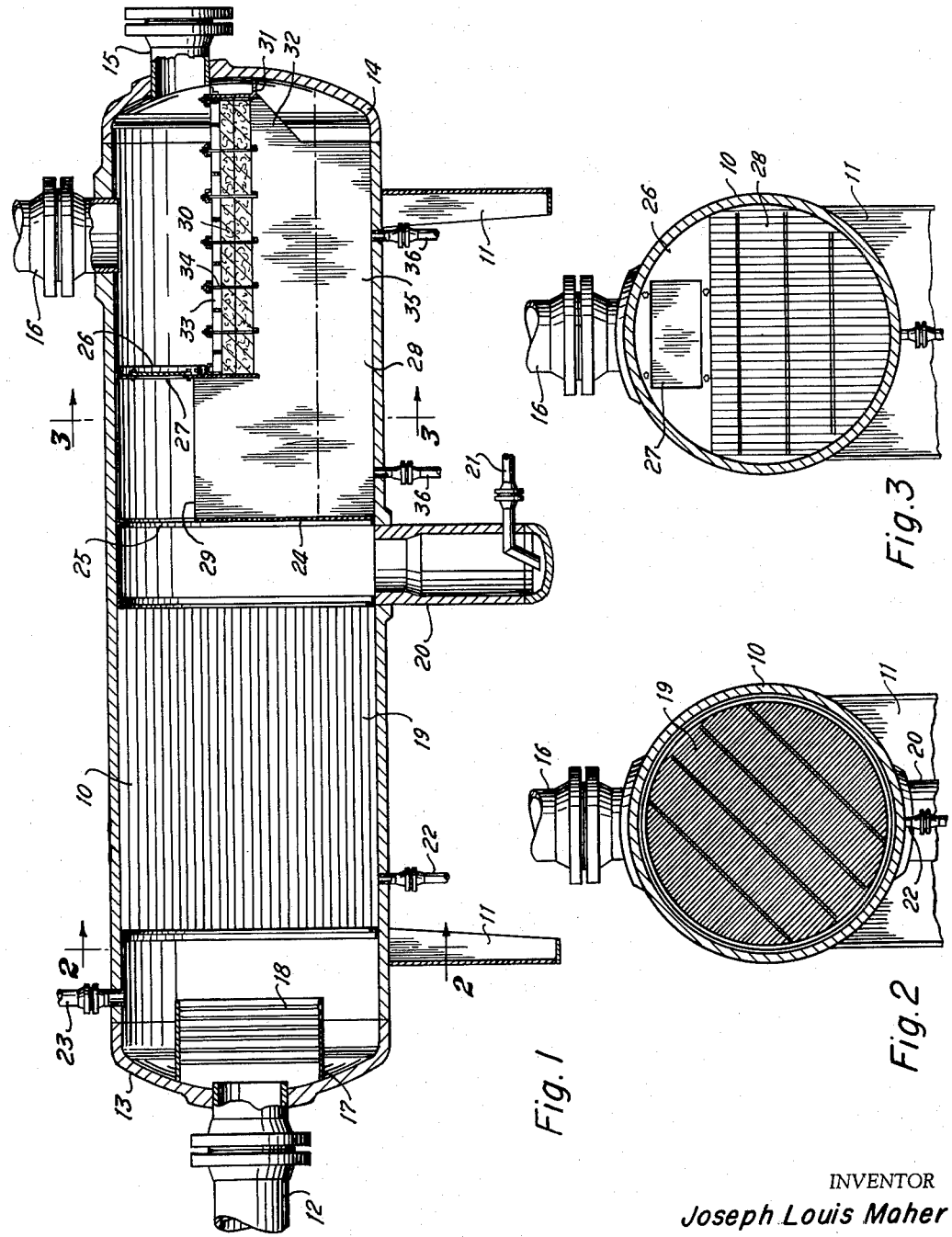
INVENTOR
Joseph Louis Maher
BY
ATTORNEYS

United States Patent Office 2,992,814
Patented July 18, 1961

2,992,814
GAS SCRUBBERS
Joseph L. Maher, Tulsa, Okla., assignor to National Tank
Company, Tulsa, Okla., a corporation of Nevada
Filed Apr. 21, 1958, Ser. No. 729,636
6 Claims. (Cl. 261—23)

This invention relates to new and useful improvements in gas scrubbers.

The invention is directed in particular to scrubbers for use in gas transmission pipe lines and for other installations in which relatively large volumes of gas must be scrubbed and thoroughly cleansed of both liquid or wet particles as well as solid or dry particles. Such conditions arise, for example, in gas transmission pipe lines in which at certain times there may be contained in the body of the gas small droplets of water, liquid hydrocarbons, and the like, and which at other times may contain dry or solid particles such as dust, flakes of rust or scale, particles of iron sulfide or other finely divided but solid or non-liquid contaminants. For protection of the pipe line, for prevention of the accumulation of liquids or solids in certain portions of the pipe line, as well as for protection of the compressors which are normally interposed at intervals in a transmission pipe line extending over considerable distances, all of these materials are desirably removed so that essentially clean and dry gas is being handled. This invention is directed toward achieving of these desirable objectives with a simple but highly efficient and effective structure.

It is, therefore, one object of this invention to provide an improved gas scrubber effective for the removal of liquid particles from a gas stream followed by effective trapping and removal of solid particles.

A further object of the invention is to provide an improved gas scrubber wherein the gas is first passed through a liquid removal zone, followed by a causing of the gas to undergo one or more reversals in direction in proximity to a body of liquid or cleaning material for trapping solid particles, the gas being passed adjacent the material between a plurality of turbulence-eliminating vanes or plates.

Still another object of the invention is to provide an improved gas scrubber in which the gas stream is caused to flow in one direction between a plurality of turbulence eliminating vanes or plates, and then caused to undergo a sharp reversal in direction over the surface of a body of liquid having the property of trapping foreign particles thrown from the gas stream by the reversal in direction, the gas stream then passing in the opposite direction for discharge.

An additional object of the invention is to provide a gas scrubber of the character described in which the gas stream is passed through a highly efficient mist extractor and filter following its passage over the body of particle entrapping liquid.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a longitudinal, vertical, sectional view illustrating a gas scrubber constructed in accordance with this invention, and FIGS. 2 and 3 are transverse, vertical, cross-sectional views taken upon the respective lines of FIG. 1.

In the drawings, the numeral 10 designates an elongate, horizontal, cylindrical vessel mounted upon suitable supports 11 and having an inlet conductor 12 opening thereinto through dished inlet head 13. A closure head 14, similar to the head 13, is provided at the opposite end of the vessel 10 and carries a manway or inspection fitting 15. A gas outlet conductor 16 extends upwardly from the vessel adjacent the head 14.

The inlet of the conductor 12 into the vessel 10 is enclosed by an initial separator structure 17 similar to that shown in U.S. Letters Patent to Glasgow, No. 2,657,-760, and consisting primarily of a plurality of spaced and staggered vertical baffles 18 of angular cross-section which present a plurality of traps or baffles for catching large liquid particles entering the vessel 10 and also for the purpose of deflecting the incoming gas stream and preventing its direct impingement upon other elements within the vessel 10. Of course, the entry of the gas stream from the relatively small conductor 12 into the relatively large vessel 10 results in a considerable slowing of the rate of flow of the gas stream whereby liquid particles present in the gas stream, along with possibly some solid particles, immediately begin to settle from the gas stream and fall by gravity to the lower portion of the vessel 10.

It is not essential to employ a secondary separating element within the scrubber structure, but it is often desirable to utilize a multiplicity of closely spaced, parallel, longitudinally-extending baffles 19, which may be similar to the horizontal baffles shown in the above patent to Glasgow, for further removal of fine liquid particles, and possibly some solid particles. As shown in FIGS. 1 and 2, the baffles 19 extend longitudinally of the vessel 10 and transversely thereacross at an angle which may vary from the horizontal to near 45 degrees. In passing between the baffles 19, the gas stream is divided into a multiplicity of relatively-thin laminae in which liquid particles must settle by gravity through only a very short distance before encountering and wetting one of the baffles 19 so as to be trapped thereon. The reduced rate of flow of the gas stream along with the provision of a multiplicity of closely spaced and parallel baffle plates, such as the plates 19, has been found to provide very effective separation and removal of very fine liquid particles and droplets from the gas stream so that a substantially dry or liquid free gas stream is produced at the exit end of the baffle structure. The separated liquids drain downwardly from the plates 19 into the lower portion of the vessel 10 and are received in a depending sump 20 from which they may be removed through an outlet conductor 21. There is also provided an auxiliary drain outlet 22 extending from the lower portion of the vessel beneath the baffles 19, and a pressure relief connection 23 extending from the upper portion of the vessel adjacent the inlet baffle structure 17.

Immediately downstream of the sump 20, between the sump and the gas stream outlet 16, there is provided an upstanding, transverse partition 24 which extends from the bottom of the vessel 10 to a point near the upper wall thereof so as to leave a gas flow space 25 in the uppermost portion of the vessel. A second partition 26, having a removable inspection plate or cover 27, projects downwardly from the upper wall of the vessel 10 between the partition 24 and the gas outlet 16 to a plane below the upper edge of the patition 24 and near the medial axis of the vessel 10 whereby gas leaving the separator baffles 19 is caused to flow upwardly and through the space 25 and then downwardly and beneath the lower edge of the partition 26, and again reverse its path of flow to move upwardly to the gas outlet.

To direct the flow of the gas stream and force it into substantially laminar paths while eliminating turbulence therefrom, there are provided a multiplicity of vertical, closely-spaced, parallel baffle plates 28 extending from the partition 24 to a point adjacent the head 14 of the scrubber vessel, the portions 29 of the baffle plates between the partitions 24 and 26 extending upwardly in the vessel 10 to the upper edge of the partition 24, while the portions of the baffles 28 between the partition 26 and the head 14 are cut away to substantially the elevation of the lower edge of the partition 26. A mist extractor in the form of a wire mesh pad 30 extends between the lower portion of the partition 26 and a bracket 31 secured upon the inner side of the head 14, the pad 30 overlying the cut away portions of the baffles 28 and functioning to remove the last traces of liquid droplets and foreign particles from the gas stream prior to the entry of the gas stream into the outlet conductor 16.

The baffle plates 28 and mist extractor pad 30 may be constructed in any suitable or desirable manner, it having been found convenient and economical to provide the downstream ends of the plates 28 with gusset sections 32 which adjoin the bracket 31 and eliminate the need for fitting the plates 28 to the inner contour of the head 14, while the pad 30 is desirably held in place by an overlying grating 33 held against upward movement by tie rods 34 secured to the upper edges of the plates 28 and extending upwardly therefrom through the pad 30. Obviously, many alternative arrangements may be employed for positioning the pad 30 and holding it against movement under the influence of the flowing gas stream.

In the utilization of the gas scrubber structure, a body of absorbant or cleaning liquid 35 is provided in the lower part of that portion of the scrubber vessel between the partition 24 and the head 14, this liquid comprising mineral seal oil, crystal oil, other hydrocarbon liquids or any other suitable scrubbing liquids having the property of wetting the dust particles and other particles of foreign matter which are separated from the gas stream and holding them against reentry into the gas stream. Other cleaning materials may be employed which may be of a sticky nature or porous or semi-solid in form. For convenience in removal and replacement, however, a liquid cleaning material is preferred. Further, the use of a cleaning material is not essential, but is highly important to proper functioning of the scrubber.

The body of liquid may be carried at any suitable or desirable level, but must have its surface below the lower edge of the partition 26 and the lower portion of the mist pad 30 whereby the gas stream is not caused to flow or bubble through the liquid, and thus, any tendency for the liquid to be carried upwardly into the mist extractor pad 30 is avoided. The vessel may be provided with suitable drain connections 36 for addition or removal of the cleaning liquid, and, of course, gauge glass connections, safety heads, pressure and temperature connections, and the like, none of which are illustrated in the drawing, may be employed as is conventional in high pressure vessels of this type.

In the operation of the gas scrubber, the entering gas stream passes first through the preliminary separation baffles 18 in which predominantly larger liquid particles are trapped and removed, followed by passage of the gas stream through the horizontal baffles 19 in which the finer particles of liquid or mist droplets are trapped and removed for accumulation within the sump 20. Of course, some removal of solid particles and foreign matter may occur in both the separator baffles 18 and 19 and will be carried into the sump 20 for removal through the outlet 21.

The gas leaving the baffles 19 is caused to flow upwardly and then sharply downwardly between the partitions 24 and 26 and between the upper portions 29 of the baffles 28. This reversal of flow causes any remaining liquid particles, and also solid particles, to be thrown against the upper wall of the vessel 10 as well as against the partition 26 from which the separated particles may pass by gravity into the lower portion of the scrubber vessel. The major portion of the solid particles are removed, however, as the gas stream passes downwardly between the partitions 24 and 26, and then undergoes a complete reversal of flow to pass upwardly through the mist extractor pad 30. In the course of this reversal over the surface of the body of liquid 35, the dust, scale, and other foreign particles are thrown downwardly by centrifugal force due to their greater mass onto the surface of the liquid 35 by which they are rapidly wet and trapped for ultimate accumulation in the bottom of the vessel 10.

The closely spaced, vertical baffles 28 function in this instance to direct and control the flow of the gas stream and to divide it into narrow, ribbonlike sections in which substantially all opportunity for turbulence is eliminated, and the likelihood that particles of foreign matter will be held in suspension in the gas stream due to such turbulence is substantially eliminated.

In effect, a very close approach to laminar flow is obtained whereby the full benefits of centrifugal separation of the foreign matter is realized, substantially all lateral and eddy currents are avoided, and highly effective and efficient scrubbing of the gas stream results. Of course, as soon as the foreign material has come into contact with the surface of the body of liquid, it is wetted thereby and trapped to prevent its reentry into the gas stream flowing over the surface of the liquid. The mist eliminator pad 30 functions largely as a safety element to trap any liquid droplets which may still be present in the gas stream, along with particles of foreign material, but commercial use of the structure has shown the stream to be essentially clean and free of all droplets and foreign particles at this point. Over extended periods of use, there may be some contamination of the pad 30, and for this reason the manway fitting 15 is provided to permit inspection of the pad and its removal or replacement, while the removable inspection plate 27 permits inspection of the upstream portion of the scrubber structure.

As pointed out hereinabove, the utilization of the separation baffles 19 is not essential, but has been found desirable. Important features of the invention are to be found in the structure which causes a double reversal in the direction of flow of the gas stream, coupled with the substantially laminar flow of the stream, not through a body of liquid, but over the upper surface thereof while undergoing a complete reversal in its path of travel.

The foregoing description of the invention is explanatory thereof and various changes in the size, shape and materials, as well as in the details of the illustrated construction may be made, within the the scope of the appended claims, without departing from the spirit of the invention.

What I claim and desire to secure by Letters Patent is:

1. A gas scrubber including, a horizontal vessel having a gas stream inlet and a gas outlet, a transverse partition extending from the bottom of the vessel to a point near the top thereof for retaining a body of cleaning liquid in the vessel, a plurality of closely spaced substantially upright plates in the vessel having their lower edges immersed in the cleaning liquid, a second partition between the transverse partition and the gas outlet and extending from the top of the vessel to a point below the upper edge of the transverse partition, the second partition adjoining the upper edges of the plates for directing the gas stream into the plurality of flow paths formed by the plates and coacting with the body of cleaning liquid for causing the gas stream to undergo a reversal in its direction of flow while passing over the body of cleaning liquid.

2. A gas scrubber as set forth in claim 1, wherein the plates have portions extending upwardly between the transverse partition and the second partition.

3. A gas scrubber including, a vessel having a gas stream inlet and a gas stream outlet, means for retaining a body of cleaning liquid in the vessel, a plurality of closely spaced planar and substantially upright plates in the vessel having their lower edges immersed in the cleaning liquid for defining a plurality of narrow laminar flow paths in the vessel above the body of cleaning liquid, and means closely overlying the upright plates for directing all of a gas stream entering the vessel into the plurality of narrow laminar flow paths formed by the plates and coacting with the body of cleaning liquid and the gas stream outlet for causing all of the gas stream to undergo a reversal in its direction of flow while passing over the body of cleaning liquid and while passing through the plurality of flow paths and after the gas stream has been directed into the plurality of flow paths.

4. A gas scrubber including, a vessel having a gas stream inlet and a gas stream outlet, a transverse partition for retaining a body of cleaning liquid in the vessel, a plurality of closely spaced planar and substantially upright plates in the vessel having their lower edges immersed in the cleaning liquid for defining a plurality of narrow laminar flow paths in the vessel overlying the body of cleaning liquid, and means including a second partition in the vessel closely overlying the upright plates for directing all of a gas stream entering the vessel into the plurality of narrow laminar flow paths formed by the plates and coacting with the body of cleaning liquid and the gas stream outlet for causing all of the gas stream to undergo a reversal in its direction of flow while passing over the body of cleaning liquid and while passing through the plurality of flow paths and after the gas stream has been directed into the plurality of flow paths.

5. A gas scrubber including, a vessel having a gas stream inlet and a gas stream outlet, means for retaining a body of cleaning liquid in the vessel, a plurality of closely spaced substantially upright plates in the vessel having their lower edges immersed in the cleaning liquid, and means overlying the upright plates for directing all of a gas stream entering the vessel into the plurality of flow paths formed by the plates and coacting with the body of cleaning liquid and the gas stream outlet for causing the gas stream to undergo a reversal in its direction of flow while passing over the body of cleaning liquid and while passing through the plurality of flow paths and after the gas stream has been directed into the plurality of flow paths.

6. A gas scrubber including, a vessel having a gas stream inlet and a gas stream outlet, a transverse partition for retaining a body of cleaning liquid in the vessel, a plurality of closely spaced substantially upright plates in the vessel having their lower edges immersed in the cleaning liquid, and means including a second partition overlying the upright plates in the vessel for directing all of the stream entering the vessel into a plurality of flow paths formed by the plates and coacting with the body of cleaning liquid and the gas stream outlet for causing all of the gas stream to undergo a reversal in its direction of flow while passing over the body of cleaning liquid and while the gas stream is passing through the plurality of flow paths and after the gas stream has been directed into the plurality of flow paths.

References Cited in the file of this patent
UNITED STATES PATENTS

| | | |
|---|---|---|
| 1,382,961 | Doherty | June 28, 1921 |
| 1,600,762 | Hawley | Sept. 21, 1926 |
| 2,479,625 | Kimmell | Aug. 23, 1949 |
| 2,610,697 | Lovelady et al. | Sept. 16, 1952 |
| 2,812,034 | McKelvey | Nov. 5, 1957 |